United States Patent [19]

Sipos

[11] 3,714,140
[45] Jan. 30, 1973

[54] PEPTIDE SYNTHESIS
[75] Inventor: Frank Sipos, East Brunswick, N.J.
[73] Assignee: E.R. Squibb & Sons, Inc., New York, N.Y.
[22] Filed: March 16, 1971
[21] Appl. No.: 124,912

[52] U.S. Cl..............................260/112.5
[51] Int. Cl.....................C07c 103/52, C09h
[58] Field of Search.....................260/112.5

[56] References Cited

UNITED STATES PATENTS 3,563,958   2/1971   Dorman et al...................260/112.5

FOREIGN PATENTS OR APPLICATIONS 1,218,459   1/1971   Great Britain...................260/112.5

OTHER PUBLICATIONS

B. Belleau et al., J. Am. Chem. Soc., 90, 1651 (1968).
N. Izumiya et al., J. Am. Chem. Soc., 91, 2391 (1969).
N. C. Chaturvedi et al., J. Med. Chem., 13, 177 (1970).

Primary Examiner—Lewis Gotts
Assistant Examiner—Reginald J. Suyat
Attorney—Lawrence S. Levinson, Merle J. Smith, Donald J. Perrella

[57] ABSTRACT

An improved solid phase process for peptide synthesis wherein all steps of the synthesis are carried out in a solvent which produces a highly swollen state in the resin and wherein the coupling agent employed is one which forms by-products which are soluble in the solvent.

9 Claims, No Drawings

PEPTIDE SYNTHESIS

BACKGROUND OF THE INVENTION

The synthesis of peptides is a time-consuming and laborious process involving many steps. Yields are frequently poor and are complicated by problems of racemization. A recent improvement in peptide synthesis has been the solid phase method originated by Dr. R. B. Merrifield, Adv. Enzymol., 32, 221–296 (1961). While the Merrifield method has undergone many modifications, the generally used technique employs dicyclohexylcarbodiimide (DCC) coupling in dichloromethane or dimethylformamide (DMF), deprotection by hydrogen chloride in acetic acid or dioxane, neutralization by triethylamine in DMF or chloroform, and sequential washing with solvents such as acetic acid, ethanol, DMF, chloroform or dichloromethane. The solid phase method is, nevertheless, time-consuming and uneconomical in that several washes employing a different sequence of solvents are required after each reaction step and a large excess of both the coupling agent and the amino acid to be coupled are required. It is also necessary to protect reactive side chains of the amino acids used in the synthesis. Another disadvantage is that the by-product formed by the coupling agent is sparingly soluble and tends to plug the resin, resulting in reduced yields.

OBJECTS OF THE INVENTION

It is accordingly an object to provide a new and simplified procedure for peptide synthesis. Another object is to provide a process for peptide synthesis which results in higher yields and enhanced purity. A further object is to provide a method for peptide synthesis wherein all steps may be carried out in a single solvent system. Another object is to provide a method wherein a much smaller excess of coupling agent is required. Still another object is to provide a method for peptide synthesis wherein reactive side chains of amino acids may be left unprotected during the synthesis. Yet another object is to provide a new coupling agent for use in solid phase synthesis. These and other objects of the present invention will be apparent from the following description.

SUMMARY OF THE INVENTION

It has now been found that the foregoing objects are achieved by carrying out a solid phase peptide synthesis in a solvent which produces a highly swollen state in the resin and wherein the coupling agent employed forms by-products which are soluble in the solvent. The solvent is selected from the group consisting of dimethylformamide (DMF) or a halogenated alkane of up to six carbon atoms, e.g., dichloromethane, or mixtures thereof. The solvent is used for all steps of the synthesis in order to maintain a highly swollen state in the resin. The coupling agent chosen is one whose by-products are soluble in the solvent which produces a highly swollen state in the resin. Dichloromethane is a preferred halogenated alkane and N-ethoxy-carbonyl-2-ethoxy-1,2-dihydroquinoline (EEDQ) is a preferred coupling agent.

DETAILED DESCRIPTION

In conventional solid phase peptide synthesis, a variety of solvents are employed. The most frequently used technique employs DDC as coupling agent in a solvent such as dichloromethane or DMF. Deprotection is carried out by HCl in acetic acid or dioxane; neutralization is accomplished by triethylamine in DMF or chloroform; and washing is carried out sequentially with a variety of solvents such as acetic acid, ethanol, DMF, chloroform, or dichloromethane, the solvent sequence required depending upon the coupling method employed. With the solvents employed, the resin is incompletely swollen and all reactive sites in the resin are not readily accessible for reaction. Moreover, as acids are attached to the resin, not all of the reactive terminal groups of the growing peptide chain are readily accessible for reaction. When, however, the solvent or solvent mixture is chosen according to the present invention, the resin is highly swollen and substantially all reactive sites in the resin are accessible, and as the amino acids are attached to the resin, the reactive terminal groups of the growing peptide chain are more readily accessible for reaction.

Another factor militating against higher yields during conventional solid phase peptide synthesis wherein DCC is used as coupling agent is that the by-product, dicyclohexylurea, is sparingly soluble and tends to clog the resin, thereby preventing access to all of the growing peptide terminals by the reagent employed during the coupling step of the synthesis. With a coupling agent which forms soluble by-products, such as EEDQ, there is no clogging of the resin, and the same solvent may be used for all steps of the synthesis. In consequence, the resin remains swollen and all of the growing peptide chain terminals are accessible to the reagent and yields are higher than heretofore obtainable. It has been found that much lower excesses of coupling agent and amino acid are required when carrying out a peptide synthesis according to the present invention, probably due to the greater availability for reaction of reactive sites and due to the fact that there is no clogging of the resin as the by-products are soluble. For example, when employing EEDQ as coupling agent, an excess of only 100 percent is needed for substantially quantitative coupling instead of a 200 to 400 percent excess of both N-protected amino acid and of coupling agent usually required when employing DCC.

It has been found and is a feature of the present invention that when carrying out a peptide synthesis according to the present invention that the hydroxyl groups of serine, threonine and tyrosine need not be protected.

The following examples illustrate the invention without, however, limiting the same thereto. Unless otherwise indicated, all of the procedures in the following examples are carried out at room temperature.

EXAMPLE 1

L-Pyroglutamyl-L-arginyl-L-phenylalanyl-L-leucyl-L-proline

Seven grams of Boc-L-proline resin ester prepared according to the method described in Stewart et al., Solid Phase Peptide Synthesis, W. H. Freeman, San Francisco, p. 32, and containing 0.53 mMol of L- proline in 1 g of resin, are placed in a 300 ml solid phase reaction vessel. The resin ester is stirred or rocked in 150 ml of dichloromethane for 20 minutes.

A. Coupling Steps

Coupling of L-leucine

The Boc-L-proline resin ester is deprotected by treatment with 120 ml of a trifluoroacetic acid:dichloromethane solution (1:1, v/v) for 35–40 minutes followed by three washings, each with 120 ml of dichloromethane, each wash lasting 3 minutes. The washed L-proline resin ester is neutralized with 120 ml of a 10 percent triethylamine solution in dichloromethane (v/v) and washed five times, each wash being carried out with 120 ml of dichloromethane for 3 minutes. Dichloromethane (120 ml) containing 1.06 mMol (100 percent excess) of Boc-L-leucine is added and the mixture stirred for 15–20 minutes. EEDQ (2.61 g, 100 percent excess) in absolute ethyl alcohol (15 ml) is then added. While the coupling is completed in 4 hours as indicated by the ninhydrin test on a 5 to 10 mg sample of the resin, the mixture is agitated overnight. The peptide resin is then washed three times, each wash being carried out with 120 ml of dichloromethane for 3 minutes.

Coupling of L-phenylalanine

The foregoing procedure for coupling L-leucine is repeated except that a dichloromethane solution of a 100 percent molar excess of Boc-L-phenylalanine is substituted for L-leucine. While the coupling is completed in four hours as indicated by the ninhydrin test, the mixture is agitated overnight before the final washings.

Coupling of L-nitroarginine

The foregoing procedure for coupling L-leucine is repeated except that a dichloromethane solution of a 100 percent molar excess of L-nitroarginine is substituted for L-leucine. The coupling is completed overnight.

Coupling of L-pyroglutamic acid

The foregoing procedure for coupling L-leucine is repeated except that a dichloromethane solution of a 100 percent molar excess of L-pyroglutamic acid is substituted for L-leucine. The coupling is completed overnight.

B. Cleavage Step

After coupling the L-pyroglutamic acid, the peptide resin is suspended in 120 ml of a trifluoroacetic acid: dichloromethane solution (1:1, v/v). A slow stream of dry HBr is passed through the suspension for 30 minutes. The suspension is then filtered and the operation repeated with a second 120 ml portion of the trifluoroacetic acid: dichloromethane solution. The combined filtrates are evaporated to dryness in vacuo and the oily residue precipitated to dryness in ether. The yield of crude peptide is 1.85 g (72.5 percent).

C. Deprotection

One gram of the crude peptide from step B is dissolved in 70 ml of methanol:acetic acid:water (5:3:2, v/v) and hydrogenated over 0.5 of 10% Pd on charcoal. The yield is 840 mg of L-pyroGlu-L-Arg-L-Phe-L-Leu-L-Pro-OH having the following amino acid analysis:

| | |
|---|---|
| Pro | 1.00 |
| Leu | 1.09 |
| Phe | 1.02 |
| Arg | 1.08 |
| Glu | 1.11. |

D. Purification

The pentapeptide (200 mg) is purified by column chromatography on Sephadex G–10 (1.0 × 80 cm) in 1 percent acetic acid. The yield is 180 mg of pure material. The overall yield is 65%, $[a]_D^2$ −47.3 (C=1, acetic acid). The purified pentapeptide has the following amino acid analysis:

| | |
|---|---|
| Pro | 1.00 |
| Leu | 1.08 |
| Phe | 1.00 |
| Arg | 1.08 |
| Glu | 1.11. |

Thin layer chromatography on silica gel in n-butanol: acetic acid:water:pyridine (30:6:20:24) $R_f$ 0.3.

EXAMPLE 2

L-sarcosyl-L-norleucyl-L-phenylalanyl-L-alanyl-L-proline

Seven g of Boc-L-proline resin ester are prepared as described in Example 1. The following amino acids, L-alanine, L-phenylalanine, L-norleucine and L-sarcosine having their N-terminal groups protected by Boc, are coupled sequentially to the proline resin ester as described in part A of Example 1. The coupling of the L-alanine is completed in about 2 hours and that of the L-phenylalanine in four hours, although the peptide resin is agitated overnight after each of these couplings before continuing with the washing steps. The L-norleucine and L-sarcosine couplings are completed overnight. The crude pentapeptide is then cleaved from the resin as described in part B of Example 1. The yield of crude pentapeptide is 78 percent.

EXAMPLE 3

L-sarcosyl-L-lysyl-L-tryptophyl-L-alanyl-L-proline

The procedure of Example 2 is repeated except that L-tryptophyl is substituted for L-phenylalanine and L-lysine for L-norleucine. The coupling of the tryptophane is completed in 48 hours and that of the lysine overnight. The yield of crude product is 72 percent. The deprotecting solution used after the tryptophane coupling contains 10 percent (vol.) anisole and 2 percent (vol.) mercaptoethanol. Cleavage of the tryptophane containing pentapeptide is performed at 0°C.

EXAMPLE 4

Bradykinin

The polypeptide, Bradykinin, is synthesized following the procedure of Example 1. No protecting groups are employed for the reactive side chain of serine. The yield of crude product is 61 percent.

EXAMPLE 5

C-terminal octapeptide of Cholecystokinin

The C-terminal octapeptide of Cholecystokinin is prepared following the procedure of Example 1 without the necessity of protecting the hydroxyl group of tyrosine. The yield of octapeptide is 41 percent.

What is claimed is:

1. In a process for the preparation of a peptide wherein
   an N-protected amino acid or peptide is coupled by means of a coupling agent to the unprotected N-terminal amino group of an amino acid or peptide which amino acid or peptide is coupled at its C-terminal group to an insoluble resin,
   the improvement comprising carrying out the coupling and cleavage steps of the synthesis in a solvent which produces a highly swollen state in the resin, and employing a coupling agent which forms by-products that are soluble in the solvent.

2. A process according to claim 1 wherein the coupling agent is N-ethoxycarbonyl-2-ethoxy-1,2-dihydroquinoline.

3. A process according to claim 1 wherein the solvent is DMF or a halogenated alkane, or a mixture thereof.

4. A process according to claim 3 wherein the solvent is dichloromethane.

5. A process according to claim 1 wherein the protected N-terminal amino group is deprotected and another amino acid or peptide is coupled to the resulting deprotected N-terminal amino group.

6. A process according to claim 5 wherein the deprotecting and coupling steps are repeated as often as required to form the desired peptide.

7. A process according to claim 2 wherein the solvent is dichloromethane.

8. A process according to claim 5 wherein the coupling agent is N-ethoxycarbonyl-2-ethoxy-1,2-dihydroquinoline and the solvent is dichloromethane.

9. A process according to claim 6 wherein the coupling agent is N-ethoxycarbonyl-2-ethoxy-1,2-dihydroquinoline and the solvent is dichloromethane.

* * * * *

KX32

PO-1050
(5/69)

UNITED STATES PATENT OFFICE
CERTIFICATE OF CORRECTION

Patent No. 3,714,140               Dated January 30, 1973

Inventor(s) Frank Sipos

It is certified that error appears in the above-identified patent and that said Letters Patent are hereby corrected as shown below:

Column 2, line 5, "DDC" should read --DCC--.

Signed and sealed this 3rd day of July 1973.

(SEAL)
Attest:

EDWARD M. FLETCHER, JR.                Rene Tegtmeyer
Attesting Officer                      Acting Commissioner of Patents